(12) United States Patent
Riedel et al.

(10) Patent No.: US 7,641,224 B2
(45) Date of Patent: Jan. 5, 2010

(54) VEHICLE OCCUPANT RESTRAINT SYSTEM INCLUDING AN AIRBAG

(75) Inventors: Andreas Riedel, Illertissen (DE); Jochen Schaupp, Aalen (DE); Ralf Gutmann, Ulm (DE); Oliver Glockler, Nersingen (DE)

(73) Assignee: Takata-Petri AG, Aschaffenburg (DE)

( * ) Notice: Subject to any disclaimer, the term of this patent is extended or adjusted under 35 U.S.C. 154(b) by 334 days.

(21) Appl. No.: 11/458,293

(22) Filed: Jul. 18, 2006

(65) Prior Publication Data

US 2007/0013174 A1 Jan. 18, 2007

(30) Foreign Application Priority Data

Jul. 18, 2005 (DE) ........................ 10 2005 034 249

(51) Int. Cl.
*B60R 21/26* (2006.01)
(52) U.S. Cl. ................. 280/729; 280/728.1; 280/730.1; 280/730.2
(58) Field of Classification Search .............. 280/728.1, 280/729, 730.1, 730.2
See application file for complete search history.

(56) References Cited

U.S. PATENT DOCUMENTS

| 3,324,656 | A | 6/1967 | Bradshaw |
|---|---|---|---|
| 3,473,824 | A | 10/1969 | Carey |
| 3,527,475 | A | 9/1970 | Carey |
| 3,900,210 | A | 8/1975 | Lohr et al. |
| 4,592,588 | A | 6/1986 | Isono et al. |
| 5,016,913 | A | 5/1991 | Nakajima et al. |
| 5,219,179 | A | 6/1993 | Eyrainer et al. |
| 5,240,283 | A | 8/1993 | Kishi et al. |
| 5,246,250 | A | 9/1993 | Wolanin et al. |
| 5,478,111 | A | 12/1995 | Marchant et al. |
| 5,718,450 | A | 2/1998 | Hurford et al. |
| 5,765,863 | A | 6/1998 | Storey et al. |
| 5,833,265 | A | 11/1998 | Seymour |
| 5,971,427 | A | * 10/1999 | Whited et al. ............ 280/730.2 |
| 6,017,057 | A | 1/2000 | O'Docherty |
| 6,126,196 | A | 10/2000 | Zimmerman |
| 6,135,493 | A | 10/2000 | Jost et al. |
| 6,402,190 | B1 | 6/2002 | Heudorfer et al. |
| 6,439,605 | B2 | 8/2002 | Ariyoshi |
| 6,447,006 | B1 | 9/2002 | Hess et al. |
| 6,705,642 | B1 | 3/2004 | Serban et al. |

(Continued)

FOREIGN PATENT DOCUMENTS

DE 40 22 420 A1 2/1991

(Continued)

*Primary Examiner*—Paul N. Dickson
*Assistant Examiner*—Barry Gooden, Jr.
(74) *Attorney, Agent, or Firm*—Foley & Lardner LLP

(57) ABSTRACT

A vehicle occupant restraint systems including an airbag which has a first airbag chamber and a second airbag chamber or, more generally, a first partial region and a second partial region. The first and the second airbag chambers are connected to each other so that, as a function of the internal pressures present, gas from the first airbag chamber can flow into the second airbag chamber and gas from the second airbag chamber can flow into the first airbag chamber. The second airbag chamber may include an elastic wall, so that, upon a loading of the first airbag chamber, gas flows into the second airbag chamber and, in the process, elastically expands the second airbag chamber.

7 Claims, 3 Drawing Sheets

U.S. PATENT DOCUMENTS

| | | |
|---|---|---|
| 6,722,695 B2 | 4/2004 | Kobayashi et al. |
| 6,802,529 B2 | 10/2004 | Takedomi et al. |
| 2002/0047253 A1 | 4/2002 | Rasch et al. |
| 2003/0234528 A1 | 12/2003 | Bohn et al. |
| 2004/0090054 A1 | 5/2004 | Bossecker et al. |
| 2005/0057025 A1 | 3/2005 | Hoffman |
| 2006/0022439 A1* | 2/2006 | Bayley et al. ............... 280/729 |
| 2006/0202450 A1* | 9/2006 | Madasamy et al. .......... 280/729 |

FOREIGN PATENT DOCUMENTS

| | | |
|---|---|---|
| DE | 296 17 586 U1 | 3/1997 |
| DE | 196 30 855 A1 | 7/1997 |
| DE | 196 33 883 A1 | 2/1998 |
| DE | 196 40 322 A1 | 3/1998 |
| DE | 199 11 082 A1 | 10/1999 |
| DE | 198 24 601 A1 | 12/1999 |
| DE | 199 23 483 A1 | 11/2000 |
| DE | 199 30 155 A1 | 1/2001 |
| DE | 199 30 157 A1 | 1/2001 |
| DE | 100 18 170 A1 | 10/2001 |
| DE | 103 42 754 A1 | 3/2005 |
| EP | 0 638 466 A1 | 2/1995 |
| EP | 0 670 247 A1 | 9/1995 |
| EP | 0 785 106 A1 | 7/1997 |
| EP | 0 835 193 B1 | 4/1998 |
| EP | 0 835 787 A1 | 4/1998 |
| EP | 0 910 520 B1 | 4/1998 |
| EP | 1 022 198 A1 | 7/2000 |
| EP | 1 375 262 A1 | 1/2004 |
| EP | 1 391 355 A2 | 2/2004 |
| EP | 1 391 355 A3 | 2/2004 |
| EP | 1 486 384 A2 | 12/2004 |
| WO | WO 00/71389 A1 | 11/2000 |
| WO | WO 00/71390 A1 | 11/2000 |
| WO | WO 03/039919 A1 | 5/2003 |
| WO | WO 03/043859 A1 | 5/2003 |

* cited by examiner

VEHICLE OCCUPANT RESTRAINT SYSTEM INCLUDING AN AIRBAG

BACKGROUND

The application relates to vehicle occupant restraint systems and to a method for distributing gas between two airbag chambers of an airbag, and to a method for increasing the internal pressure in a partial region of an airbag.

Multipart airbags for vehicle occupant restraint systems, which have at least one first and one second airbag chamber, are generally known. Multichamber airbags of this type are used, for example, in side airbag systems, the airbag forming, for example, a thorax chamber and a head chamber. A multichamber airbag of this type is described in U.S. 5-A-5,718, 450.

EP 1 375 262 A1 and EP 0 835 193 B1 describe airbag systems, in which an inner bag or a tube is situated in the interior of a main chamber of an airbag and, when the airbag is deployed, is rolled back outwards. In this case, the parts which are rolled back outwards have a discharge opening. The effect of the airbag systems described is to provide a discharging of gas from a discharge opening in a manner offset in terms of time by the regions which are arranged on the inside first of all having to be rolled back outwards.

EP 1 022 198 A1 discloses an airbag system, in which a discharge opening of an airbag is closed on its outer side by an elastic membrane. The elastic membrane expands without being separated from the airbag in the event of the airbag interacting with a vehicle occupant and there being an associated increase in pressure in the airbag. In this case, a low equalizing volume is provided.

DE 100 18 170 A1 describes an airbag arrangement for motor vehicles with an inflatable airbag, the expansion of which is restricted by a restricting casing in the event of an occupant being out of position. In the normal protective case, the restriction casing tears due to a higher internal pressure in this case in the airbag.

SUMMARY

According to an embodiment disclosed herein, a vehicle occupant restraint system is provided that includes an airbag including a first airbag chamber and a second airbag chamber, the first airbag chamber configured to interact with a vehicle occupant when the airbag deploys. The first and the second airbag chambers are connected to each other so that, as a function of the internal pressures present in the chambers, gas can flow from the first airbag chamber into the second airbag chamber and gas can flow from the second airbag chamber into the first airbag chamber. The airbag is configured so that the second airbag chamber has an elastic wall.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DESCRIPTION

Figure 1:
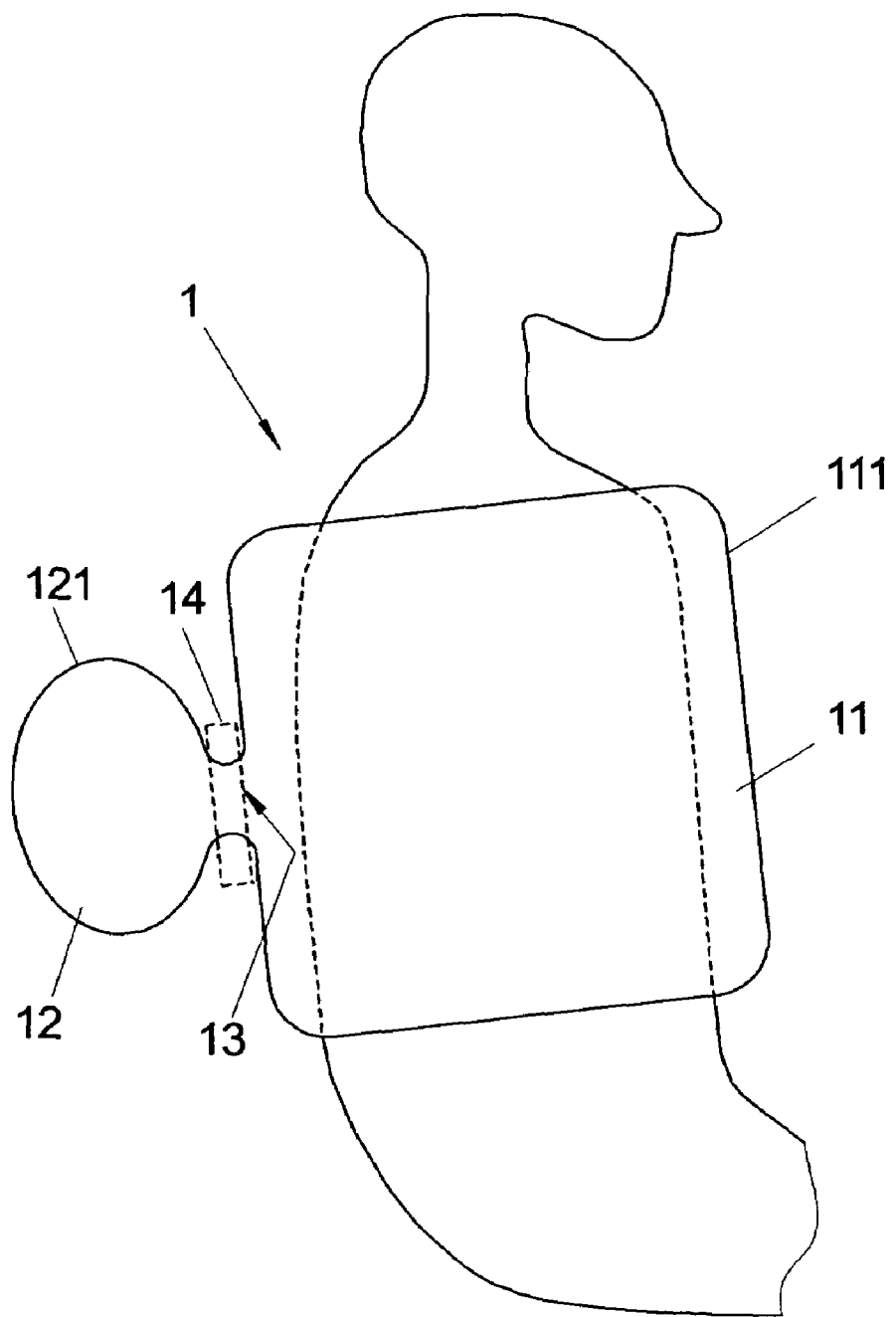
FIG. 1 shows, diagrammatically, a vehicle occupant restraint system with an airbag which has a main chamber and an elastic additional chamber.

An embodiment disclosed herein is based, in part, on the object of providing vehicle occupant restraint systems with airbags which provide a functional interaction between various partial regions or chambers of an airbag in an intelligent manner. Furthermore, the disclosed embodiments are based, in part, on the object of providing simple and effective methods for distributing gas between two airbag chambers of an airbag and for increasing the internal pressure in a partial region of an airbag.

According thereto, a first disclosed embodiment may be distinguished in that, in a multipart airbag with at least one first and one second airbag chamber, the first and the second airbag chambers are connected to each other so that, as a function of the internal pressures present, gas from the first airbag chamber can flow into the second airbag chamber and gas from the second airbag chamber can flow into the first airbag chamber. In other words, if the internal pressure in the first airbag chamber is greater than the internal pressure in the second airbag chamber, gas can flow into the second airbag chamber, and, if the internal pressure in the second airbag chamber is greater than the internal pressure in the first airbag chamber, gas can flow into the first airbag chamber. Furthermore, the second airbag chamber is provided with an elastic wall, i.e. is designed as an elastic airbag chamber.

This refinement makes it possible that, for example when there is an increased loading of the first airbag chamber upon intrusion or upon interaction with a vehicle occupant and there is an associated increased internal pressure in the first airbag chamber, gas is pressed from the first airbag chamber into the second airbag chamber (until there is the same internal pressure in both chambers), with the second airbag chamber, which is of elastic design, inflating. The elastic design of the second airbag chamber has the further advantage that, when the first airbag chamber is relieved from pressure, gas from the second airbag chamber is pressed back into the first airbag chamber. By this means, the airbag continues to provide a protective function even in the event of an additional impact or knock. In the case of known airbags, the gas, which serves to absorb energy, by contrast flows irreversibly, after the first impact, out through discharge openings provided in the airbag, with the result that a protective function is only provided for the first impact.

It is possible here for the first airbag chamber and the second airbag chamber to be connected to each other by a pressure-controlled valve and therefore only from a predetermined pressure in the first airbag chamber does gas flow from the first airbag chamber into the second airbag chamber. However, after this valve is opened, gas can flow to and fro in both directions between the airbag chambers, so that, when the pressure in the first airbag chamber is reduced, gas can flow back from the second airbag chamber into the first airbag chamber and can increase the pressure there again.

In an alternative refinement, however, the first airbag chamber and the second airbag chamber are connected to each other from the outset, for example via a connecting opening, so that gas can flow between the two airbag chambers at all times.

The airbag is preferably designed as a side airbag which is integrated, for example, into the seatback of a vehicle seat. The second airbag chamber of the deploying airbag preferably extends between the seatback and an associated lateral vehicle structure, for example a vehicle door or a vehicle pillar. In principle, an airbag with an equalizing volume provided by a second airbag chamber may also be realized, however, in the case of other airbag systems, such as front airbags.

Furthermore, the second airbag chamber is preferably designed and positioned in the vehicle so that it cannot come into interaction with a vehicle occupant. The second airbag chamber in this refinement is a pure equalizing chamber. In principle, however, it is possible for the second airbag chamber, in the event of being triggered, also to come into interaction with a vehicle occupant.

According to another disclosed embodiment a method for distributing gas between two airbag chambers of an airbag with an elastic airbag chamber is provided. The method includes the following steps: providing an airbag with at least one first airbag chamber and one second airbag chamber, the second airbag chamber having an elastic wall; arranging the airbag in a vehicle so that, in the event of being triggered, the first airbag chamber comes into interaction with a vehicle occupant; and in the event of being triggered, providing an internal pressure at least in the first airbag chamber. The method also provides for, upon intrusion or loading of the first airbag chamber, gas flowing from the first airbag chamber into the second airbag chamber, with the second airbag chamber expanding elastically, and when the intrusion or loading of the first airbag chamber ceases, gas flowing from the second airbag chamber back into the first airbag chamber.

If appropriate, this method may also be realized a number of times, with the flow passing to and fro between the two chambers during a plurality of successive impact processes. This is possible, since the gas, after the first impact, is not let out through discharge openings but rather is temporarily stored to a certain extent in an elastic additional chamber.

A second embodiment makes provision, in the case of a vehicle occupant restraint system with an airbag having at least two partial regions, for one partial region to be designed and positioned in the vehicle so that, firstly, it cannot come into interaction with a vehicle occupant and, secondly, can be compressed by at least one intruding vehicle part, with, in the event of an intrusion of the vehicle part, gas being conducted into the other partial region and increasing the internal pressure there. For example, the one partial region is arranged adjacent to the B-pillar of the vehicle, in particular between B-pillar and vehicle seat, so that it is compressed upon an intrusion of the B-pillar (for example in the event of a side impact of another vehicle).

This embodiment makes it possible to fill the partial region of the airbag that, in the event of being triggered, comes into interaction with a vehicle occupant (also referred to below as main region or as main chamber) with gas only at a comparatively low pressure. Only in the event of a collision, when the one partial region is compressed by the intruding vehicle part and its gas is at least partially conducted into the main region is the pressure in the main region, which comes into interaction with a vehicle occupant, increased. If there is no intrusion or if the airbag system is erroneously triggered, the pressure in the main chamber is therefore at a low level, with the result that situations in which an occupant is out of position are noncritical, i.e., owing to the low pressure level of the main region, a vehicle occupant in the event of being out of position does not have to be prepared for being injured. By contrast, in a very serious collision leading to an intrusion of a vehicle part, the internal gas pressure of the main region is increased, so that an increased absorption of energy by the airbag is possible.

In a preferred embodiment of the second embodiment, the first partial region and the second partial region of the airbag are formed by two airbag chambers, the airbag chamber which forms the first partial region serving as main chamber, and the airbag chamber which forms the second partial region serving as additional chamber. The two airbag chambers are connected to each other by an open connection for the flowing gas.

The formation of the first or second partial region by two separate airbag chambers is merely optional. It is likewise possible for the two partial regions to be realized in a single airbag chamber or, if the airbag only contains one airbag chamber, to be realized in a single airbag. The partial regions are then different three-dimensional regions of the airbag. Even if just one airbag is used, the reduction in volume of that partial region which is compressed by the intruding vehicle part results in an increase in pressure in the other partial region which comes into interaction with a vehicle occupant.

According to an alternative embodiment, a method for increasing the internal pressure in a partial region of an airbag which, in the event of being triggered, comes into interaction with a vehicle occupant is provided. The method includes the following steps: providing an airbag with at least one first partial region and one second partial region; and arranging the airbag in a vehicle so that the second partial region of the deployed airbag cannot come into interaction with a vehicle occupant and can be compressed by an intruding vehicle part, and the first partial region, in the event of being triggered, comes into interaction with a vehicle occupant. The method is arranged so that in the event that the airbag is triggered, a certain internal pressure in the first partial region of the airbag is provided, and upon intrusion of the vehicle part into the airbag, increasing the internal pressure in the first partial region by means of gas which flows from the second partial region into the first partial region.

In this case, a low pressure which is noncritical with regard to an occupant being out of position is firstly provided in the first partial region of the airbag in the event of it being triggered. Upon intrusion of the vehicle part under consideration, this pressure is increased by gas which is discharged from the second partial region due to the intrusion. The method therefore provides two desired internal pressures, firstly a first, reduced internal pressure which is noncritical with regard to an occupant being out of position, and a second increased internal pressure which, in the event of a collision, is associated with the intrusion of vehicle parts.

The figures each show a vehicle occupant restraint system with an airbag. In addition to the airbag illustrated, the vehicle occupant restraint system has further typical elements of a vehicle occupant restraint system, such as, in particular, a gas generator, airbag sensors and a control device. Furthermore, depending on the specific implementation, the restraint system may have elements, such as a diffuser, a gas lance or a housing. Such elements are not illustrated separately in the figures, since they are well known to a person skilled in the art.

The airbags are described further below, and it is furthermore pointed out that the airbags described below can be designed in any desired manner, in particular as a frontal airbag for the driver, as a frontal airbag for the passenger or as a side airbag.

FIG. 1 shows a vehicle occupant restraint system with an airbag 1 which comprises two airbag chambers 11, 12. The one airbag chamber 11 provides the main chamber of the airbag and serves, in the event of being triggered, to interact with a vehicle occupant who is to be protected. The other airbag chamber 12 is designed as an additional chamber which is connected to the main chamber 11 via a connecting opening 13. The connecting opening 13 enables gas to flow in both directions, i.e. both from the main chamber 11 into the additional chamber 12 and from the additional chamber 12 into the main chamber 11.

Unlike the airbag wall 111 of the main chamber 11, the airbag wall 121 of the additional chamber 12 is formed from an elastic material, so that the additional chamber 12 can increase the volume when an appropriate internal pressure is present.

In the exemplary embodiment illustrated, the airbag 1 is designed as an airbag of a side airbag for the thorax-abdomen region of a person 2 who is to be protected. However, this use is to be understood only as being by way of example. Firstly, it can likewise be a side airbag for a thorax, thorax-pelvis or a thorax-head protective system. Secondly, an airbag which has an elastic additional chamber can also be used in other airbag systems, for example in frontal airbag systems.

In the case of a side airbag system, the additional chamber 12 is arranged, for example, laterally between the vehicle backrest and the vehicle door.

In the event of being triggered, gas is introduced, in the exemplary embodiment under consideration by means of an inflator (not illustrated), into the main chamber 11, this gas also flowing on account of the connecting opening 13 into the additional chamber 12. In the event of the main chamber 11 being loaded, for example on account of a protective interaction with a vehicle occupant, the pressure increases for a short time in the main chamber 11 and therefore also in the secondary chamber 12. The increased pressure leads to the elastic additional chamber 12 expanding and inflating with the volume being increased. When the main chamber 11 is relieved from load, i.e. when there is no longer the increased external pressure on the main chamber 11, and accordingly the internal pressure of the main chamber 11 is also reduced, the volume of the elastic additional chamber 12 is reduced with the consequence that gas from the additional chamber 12 flows back into the main chamber 11 and increases the internal pressure there again.

In the event of interaction with an occupant, instead of the gas being discharged into the free surroundings, as is envisaged in the prior art, in the case of this refinement gas is temporarily stored in an elastic additional chamber and, after the loading or the interaction with the vehicle occupant ceases, is guided back again into the main chamber, so that a high pressure is once again provided there to absorb energy. By this means, protection is also provided in the case of further collisions and impacts, as is required, for example, if a number of cars drive into one another and powerful forces act in succession on the motor vehicle and its occupants.

It should be pointed out that, in the case of the refinement of FIG. 1, a pressure-controlled valve can alternatively also be provided between the main chamber 11 and the additional chamber 12. A valve 14 of this type is illustrated in FIG. 1 by dashed lines, which reproduces the optional character. A valve 14 of this type would preferably be pressure-controlled with the effect that only when there is a predetermined internal pressure in the main chamber 11 can air flow into the additional chamber 12. For example, a valve 14 of this type is realized by a discharge opening in the main chamber 11, which opening is closed by a covering which tears when a predetermined pressure is present. A refinement of this type would have the advantage that, owing to the overall smaller volume, there would be a higher pressure in the main chamber 11 than in the event of main chamber 11 and additional chamber 12 being connected to each other from the outset. Upon interaction with a vehicle occupant, the valve 14 would open, air would flow into the additional chamber 12 and would lead there to an expansion of the additional chamber 12. Reference can be made to the above embodiments in this respect.

Figure 2:
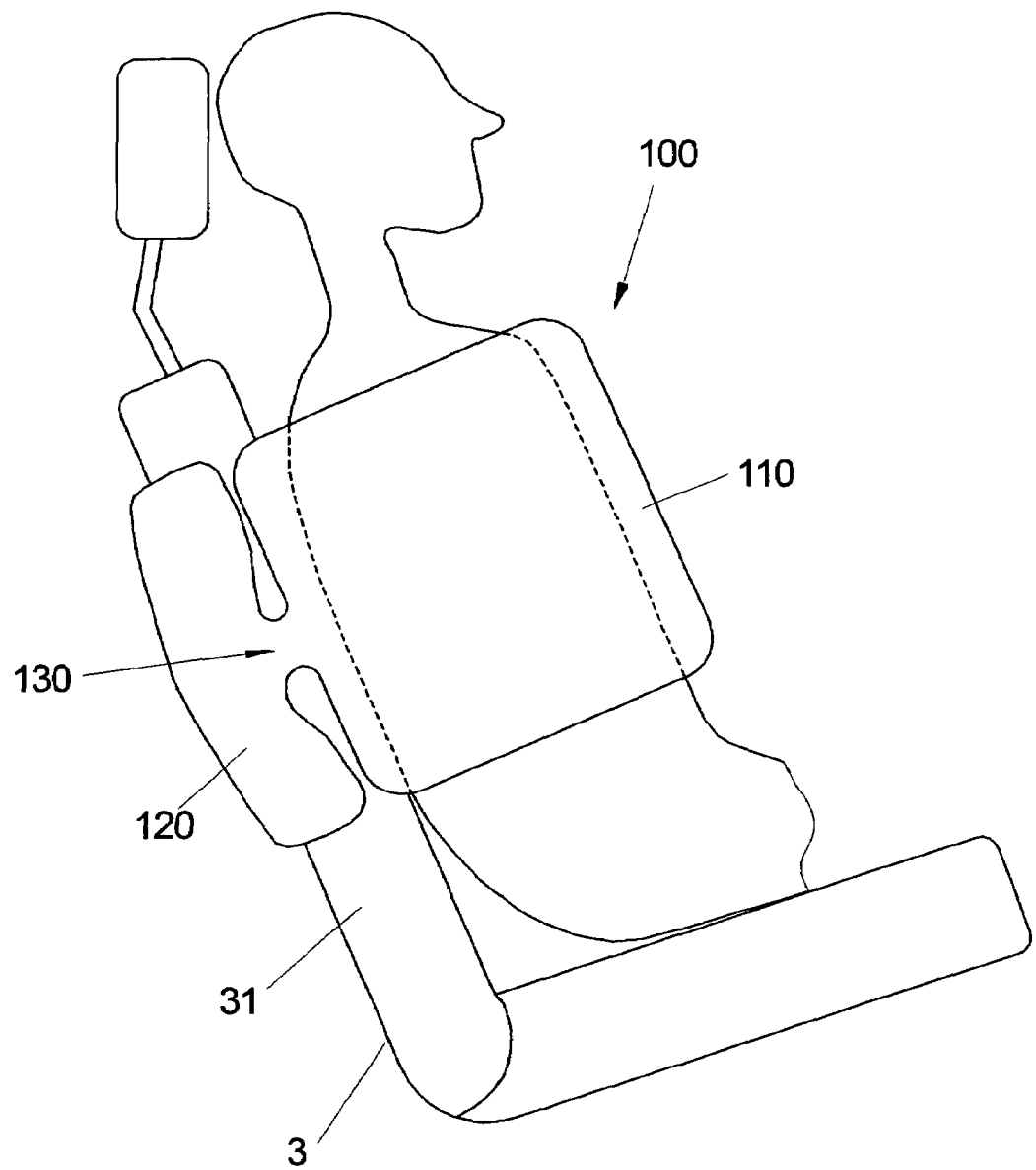
FIG. 2 shows, diagrammatically, a side airbag which is arranged in a vehicle backrest and forms a main chamber and an additional chamber, the additional chamber being compressible by intruding vehicle parts.

FIG. 2 shows a side airbag 100 which comprises a main chamber 110 and an additional chamber 120 which are connected to each other by a passage opening 130. The airbag module with the airbag 100 is integrated in the seatback 31 of a vehicle seat 3. In the event of being triggered, when the airbag 100 is filled or expands, the additional chamber 120 is arranged between the B-pillar of the vehicle (not illustrated separately) and the seatback 31.

It is now provided that, in the event of being triggered, the main chamber 110 and therefore also the additional chamber 120 is filled with gas so that the pressure level in the main chamber 110 is relatively low and, as a result, is in particular non-critical with regard to cases of an occupant being out of position. In the event of a serious vehicle collision, in which the vehicle is driven into in the region of the B-pillar by another vehicle and accordingly the B-pillar intrudes, the additional chamber 120 arranged between the B-pillar and the vehicle seat 31 is compressed, so that at any rate some of the gas in the additional chamber 120 flows into the main chamber 110 and increases the pressure there. While the pressure level in the main chamber 110 is therefore noncritical with regard to an occupant being out of position if there is no intrusion (associated with more minor accidents in the side region) or if the airbag is triggered erroneously, in the event of a collision which is associated with an intrusion of the B-pillar, the pressure in the main chamber 110 increases and, as a result, permits an increased absorption of energy by the main chamber 110. A system is therefore provided, the internal pressure of which is intrusion-controlled.

Figure 3:
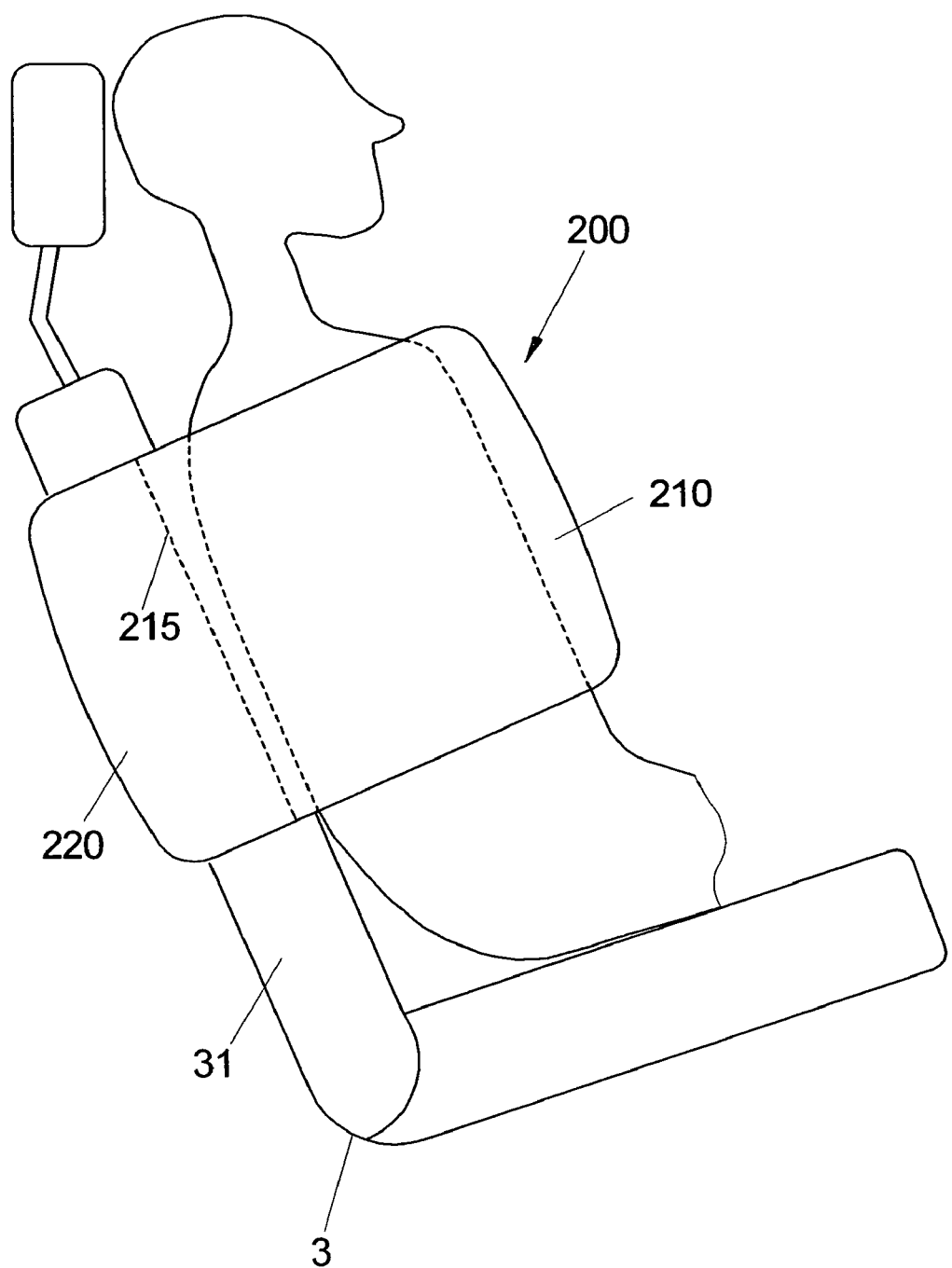
FIG. 3 shows, diagrammatically, a vehicle occupant restraint system according to FIG. 2, with a single-part airbag being used instead of a two-chamber airbag.

The exemplary embodiment illustrated in FIG. 3 differs from the exemplary embodiment of FIG. 2 in so far as the airbag 200 is not designed as a multichamber airbag but rather is of single-part design. In this case, the airbag 200 forms a main region 210 which can come into interaction with the vehicle occupant who is to be protected, and an additional region 220 which, on account of its position in the deployed state, cannot come into interaction with the vehicle occupant. The separating line 215 (illustrated in FIG. 3) between the two regions 210, 220 is not an actual line or tuck but rather is merely intended to explain the position of the two regions 210, 220.

As in FIG. 2, the additional region 220 is arranged between the B-pillar and the seatback 31 of the vehicle seat 3, so that it is compressed upon an intrusion of the B-pillar and accordingly gas is conducted into the first region 210. The described function is the same as in the refinement of FIG. 2.

The priority application, German Patent Application DE 10 2005 034 249.3, filed on Jul. 18, 2005, is incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An occupant restraint system for a vehicle, comprising:
an airbag including a first partial region and a second partial region which can be filled with gas by an inflator;
wherein the first partial region is configured so that, when the airbag is deployed, the first partial region interacts with a vehicle occupant;
wherein the second partial region is configured and positioned in the vehicle so that the second partial region cannot interact with the vehicle occupant when the airbag deploys; and
wherein the second partial region is configured to be compressed by at least one intruding vehicle part, and is configured so that upon intrusion of the vehicle part, gas from the second partial region is conducted into the first partial region to thereby increase the pressure in the first partial region.

2. The system of claim 1, wherein the second partial region is designed and positioned in the vehicle so that the second partial region is compressed by an intruding vehicle pillar.

3. The system of claim 1, wherein the first partial region is configured so that the internal pressure of the first partial region is noncritical with regard to an occupant being out of position unless gas from the second partial region is conducted into it.

4. The system of claim 1, wherein the first partial region and the second partial region are formed by two airbag chambers, wherein the airbag chamber which forms the first partial region is a main chamber, and the airbag chamber which forms the second partial region is an additional chamber smaller than the main chamber.

5. The system of claim 1, wherein the airbag is designed as a side airbag, and wherein when the airbag deploys the second partial region extends between a vehicular B-pillar and an associated front vehicle seat.

6. A method for increasing the internal pressure in a partial region of an airbag, which, in the event of being triggered, comes into interaction with a vehicle occupant, comprising the steps of:
providing an airbag with at least one first partial region and one second partial region,
providing an inflator configured to provide an internal pressure,
arranging the airbag in a vehicle so that,
i. the second partial region of the deployed airbag cannot come into interaction with a vehicle occupant and the second partial region can be compressed by an intruding vehicle part,
ii. the first partial region, in the event of being triggered, comes into interaction with a vehicle occupant,
in the event of being triggered, providing the internal pressure in the first partial region,
upon intrusion of the vehicle part, increasing the internal pressure in the first partial region by means of gas which flows from the second partial region into the first partial region.

7. The method of claim 6, wherein the internal pressure in the first partial region is noncritical with regard to an occupant being out of position before gas flows from the second partial region into the first partial region.

* * * * *

UNITED STATES PATENT AND TRADEMARK OFFICE
CERTIFICATE OF CORRECTION

| | | |
|---|---|---|
| PATENT NO. | : 7,641,224 B2 | Page 1 of 1 |
| APPLICATION NO. | : 11/458293 | |
| DATED | : January 5, 2010 | |
| INVENTOR(S) | : Riedel et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 461 days.

Signed and Sealed this

Sixteenth Day of November, 2010

David J. Kappos
*Director of the United States Patent and Trademark Office*